Aug. 16, 1955  R. F. GARNER ET AL  2,715,664
CONTROL DEVICES FOR ELECTRICALLY HEATED APPLIANCES
Filed Dec. 21, 1953  8 Sheets-Sheet 1

INVENTORS
Russell F. Garner
and William J. Russell
BY
THEIR ATTORNEY

INVENTORS
Russell F. Garner
and William J. Russell.
BY
THEIR ATTORNEY

Aug. 16, 1955     R. F. GARNER ET AL     2,715,664
CONTROL DEVICES FOR ELECTRICALLY HEATED APPLIANCES
Filed Dec. 21, 1953     8 Sheets-Sheet 7

INVENTORS
Russell F. Garner
and William J. Russell.
BY
THEIR ATTORNEY

United States Patent Office 2,715,664
Patented Aug. 16, 1955

2,715,664

CONTROL DEVICES FOR ELECTRICALLY HEATED APPLIANCES

Russell F. Garner, Youngwood, and William J. Russell, Jeannette, Pa., assignors to Robertshaw-Fulton Controls Company, Greensburg, Pa., a corporation of Delaware Application December 21, 1953, Serial No. 399,432

13 Claims. (Cl. 200—140)

This invention relates to control devices and more particularly to condition responsive controls for electrically heated appliances. In devices of this type, it is often desirable to make a pair of circuits simultaneously and thereafter cause sequential breaking of the circuits in response to changes in a temperature condition.

Such devices find utility in clothes driers which may include a motor driven shell or drum in which the clothes are placed and an electrical heating element from which heated air may be circulated, by a fan or blower, throughout the load of clothing which is undergoing the drying operation. It is apparent that considerable heat remains in the load upon completion of the drying operation although the heating element has been cut off. Hence, the load cannot be removed from the appliance with safety until after a cooling-down period which should not be too prolonged. Accordingly, the motor circuit should remain energized for a period after the heating element is deenergized to effect cooling of the load.

Another application of this type of control device is in electrically heated ovens provided with baking and broiling elements wherein it is desirable to provide for simultaneous energization of the baking and broiling elements in a preheat operation followed by energization of the baking element only in a baking operation.

Devices of this nature include switch means for controlling a pair of energizing circuits with means for setting and latching the same in circuit energizing positions. A temperature responsive device is utilized to release the latching means to break one of the circuits when a predetermined temperature is reached and to break the other circuit at a second predetermined temperature, lower than the first. U. S. Patent 2,591,802 to Garner and U. S. Patent 2,564,868 to Weber and Kunzler disclose such devices.

It is an object of this invention to permit deenergization of both energizing circuits at the will of an operator regardless of the condition of the temperature responsive means.

Another object of this invention is to utilize a control element having an "off" position and to eliminate the possibility of further heating should the control element be moved to "off" position during the operating cycle of an appliance.

Another object of this invention is manually to break heater and motor circuits at any time during the operating cycle of an appliance.

Another object of this invention is to release the latching means upon manipulation of a temperature adjusting means to permit movement of the switching means to circuit deenergizing position.

Another object of this invention is to utilize an element movable to a predetermined position for breaking one of the energizing circuits with independently operable manual means and temperature responsive means being provided for moving the element to such position.

Other objects and advantages will become apparent from the following description taken in connection with the accompanying drawings wherein.

Figure 1:
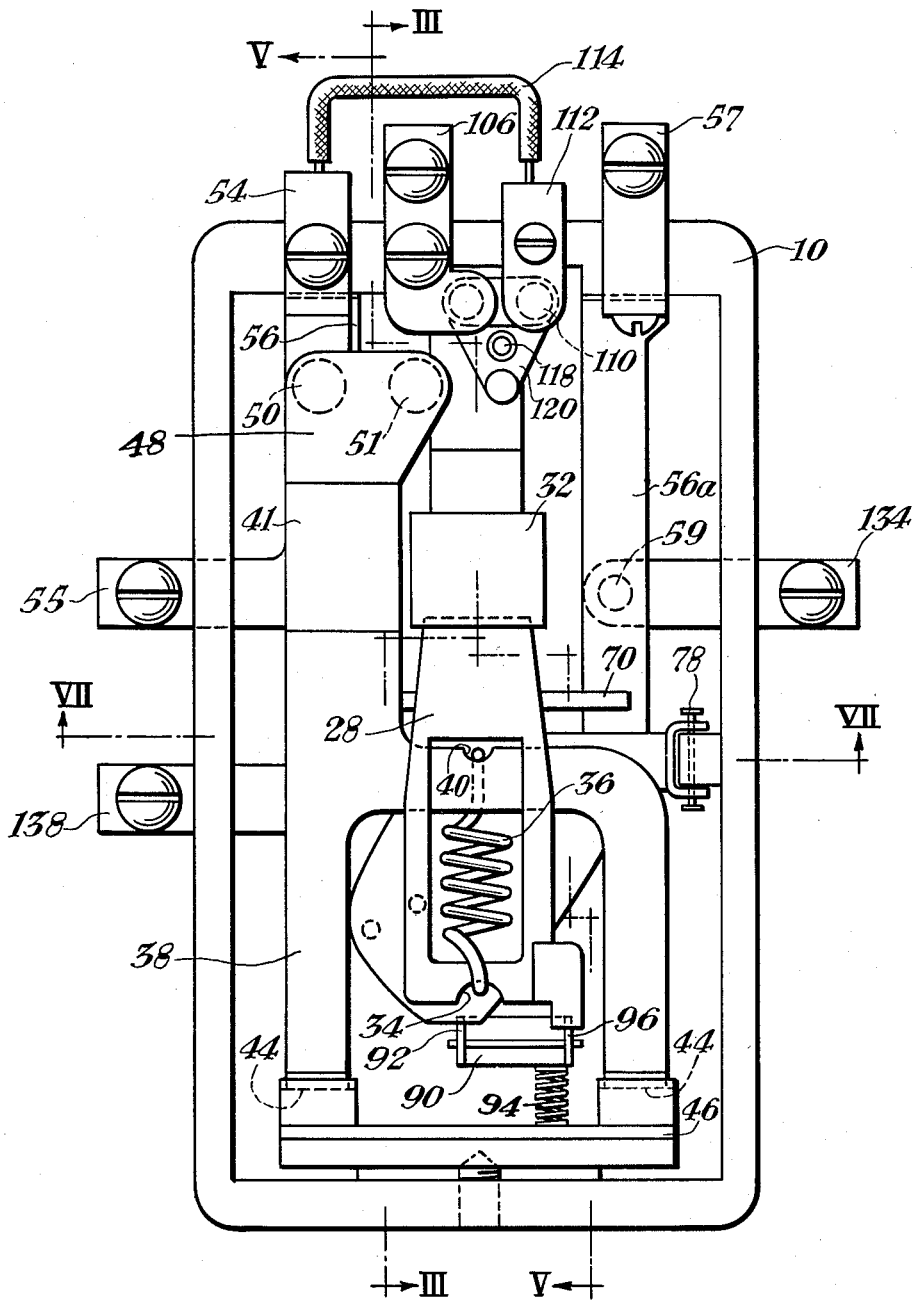
Fig. 1 is a front elevation of the control switch with the cover removed.
Figure 2:
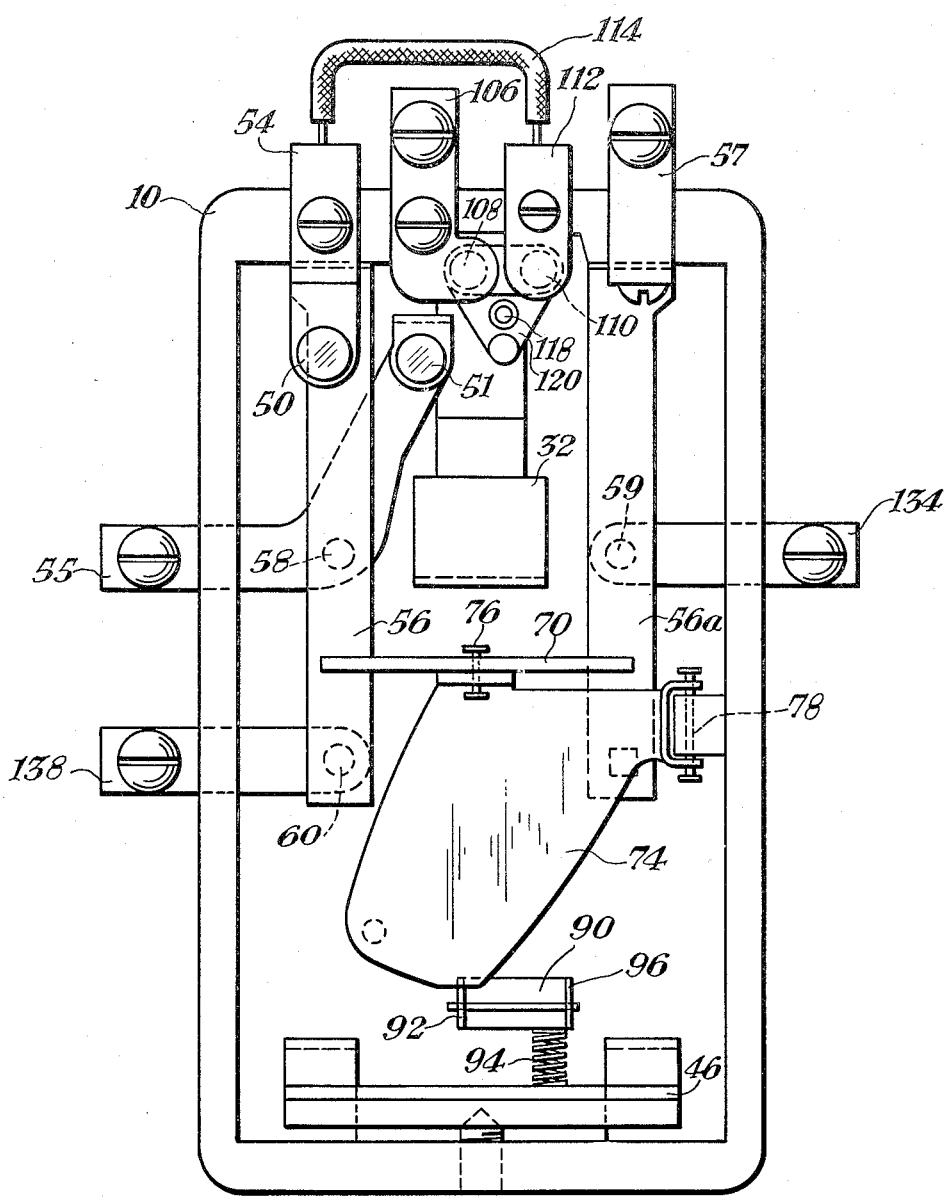
Fig. 2 is a view similar to that of Fig. 1 with the snap-action lever assembly thereof removed.

Referring more particularly to the drawings, a cup-shaped casing 10 is provided with a cover 12 for the open end thereof carrying a centrally disposed bushing 14. An adjusting screw 16 preferably provided with left-hand threads, is cooperable with the bushing 14 and carries on its exterior end the usual handle 18 by means of which the adjusting screw 16 can be rotated.

Temperature responsive means in the form of an expansible and contractible diaphragm element 20 is carried on the interior end of the adjustable screw 16 and has an operating button 22 projecting therefrom. The interior of the diaphragm 20 is in communication with a capillary tube 24 which extends exteriorly of the cover 12 for communication with the usual bulb element 25 adapted to be located in an area to be heated. The diaphragm 20, capillary tube 24, and bulb 25 are charged with a suitable thermal fluid which, when heated, will increase the pressure within the diaphragm unit 20 to expand the same and move the operating button 22 sufficiently to operate mechanism to be described hereinafter.

The button 22 extends into a depression 26 formed in the face of a main actuating lever 28 of a snap-action means. The main actuating lever 28 is provided at one end with a knife edge 30 which is cooperable with a support 32 projecting from the casing 10. The opposite end of the lever 28 is also provided with a knife edge 34 around which one end of a coil spring 36 is hooked.

A main control lever 38 of generally U-shaped configuration with a control arm extending therefrom is provided with a knife edge 40 formed in the bight portion thereof for receiving the opposite hooked end of the coil spring 36. Preferably, an insulating section 41 is incorporated in the extended control arm of the main control lever 38 to insulate it from the lower legs thereof. The lower legs are each provided with a knife edge 44 for cooperation with suitable bearings formed on an adjustable bridge element 46 supported in the casing 10. The extended arm of the main control lever 38 carries a double pole contact bridge 48 for cooperation with a pair of fixed contacts 50, 51 respectively carried by the casing 10. The contacts 50, 51 carry terminal connections 54, 55 for connection to a line wire L1 and a motor circuit respectively.

A pair of flexible switch arms 56, 56a is secured at one end to the casing 10. The switch arm 56 is connected at its fixed end to the terminal 54 and the switch arm 56a is connected at its fixed end to a terminal connection 57 adapted to be connected to a second line wire L2. The switch arms 56, 56a are formed of flexible material of an electrical conducting nature and extend in a plane substantially parallel with the control lever 38 of the snap-action means.

The switch arm 56 carries a pair of spaced contacts 58, 60 on one side thereof. The switch arm 56a carries a single contact 59 on one side thereof. Secured to the inner surface of the casing 10 is a pair of fixed contacts 58a, 60a positioned for cooperation with the contacts 58, 60 respectively on the switch arm 56. The contact 58a is connected to the fixed contact 51. A third fixed contact 59a is secured to the inner face of the casing 10 for cooperation with the contact 59 on the switch arm 56a. Each of the switch arms 56, 56a has an inherent bias for holding the contacts 58, 59, 60 out of engagement with the fixed contacts 58a, 59a, 60a respectively.

Means is provided for moving the flexible switch arms 56, 56a to close the contacts 58, 58a, 60, 60a and 59, 59a. To this end a movable member in the form of a toggle plate 70 of insulating material is provided for movement toward and away from the flexible switch arms 56, 56a and has a pair of projections 72 positioned to be operatively engageable with the switch arms 56, 56a respectively. The plate 70 is pivotally mounted in the casing 10 by the provision of an operating lever 74 which is secured to the toggle plate 70 at one end by a pin 76 and which is mounted at the other end on a pivot 78 carried on a wall of the casing 10. With this arrangement, the operating lever 74 is movable in a path transverse to the path of movement of the plate 70.

Figure 4:
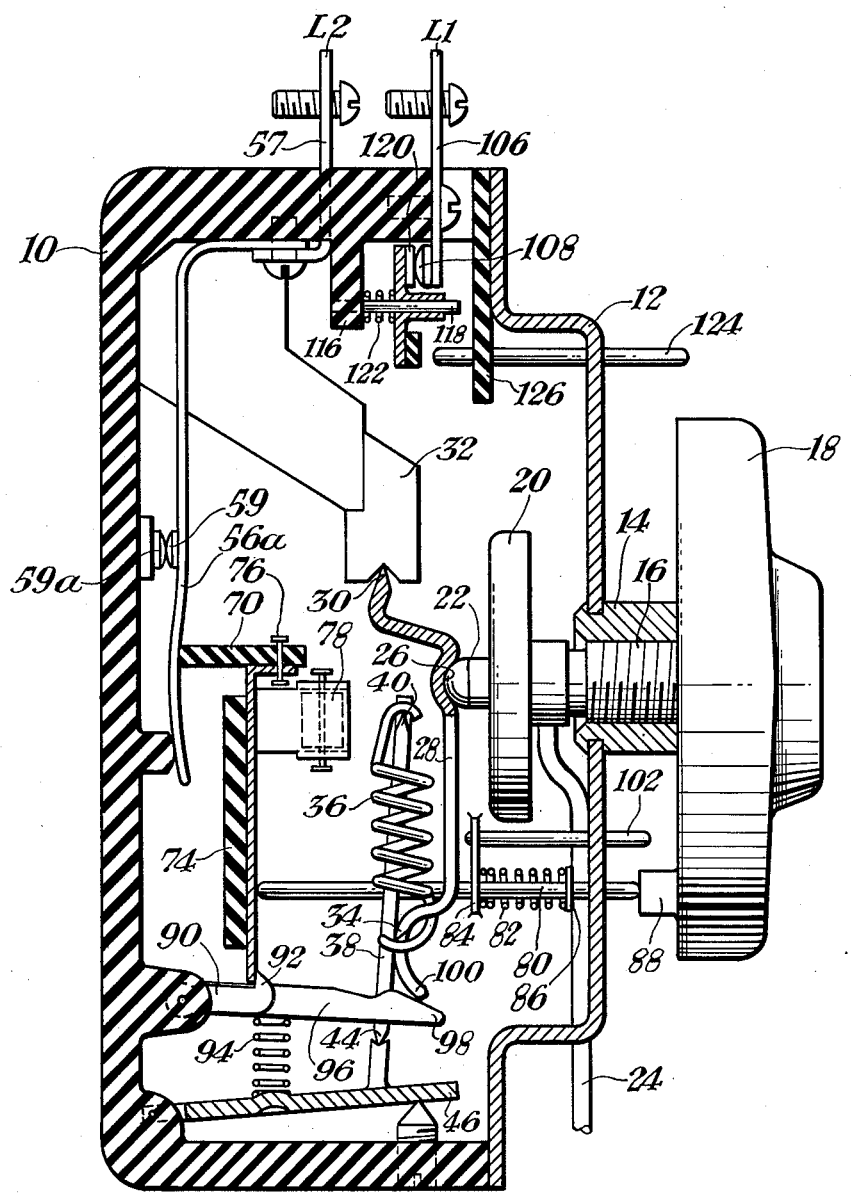
Figure 6:
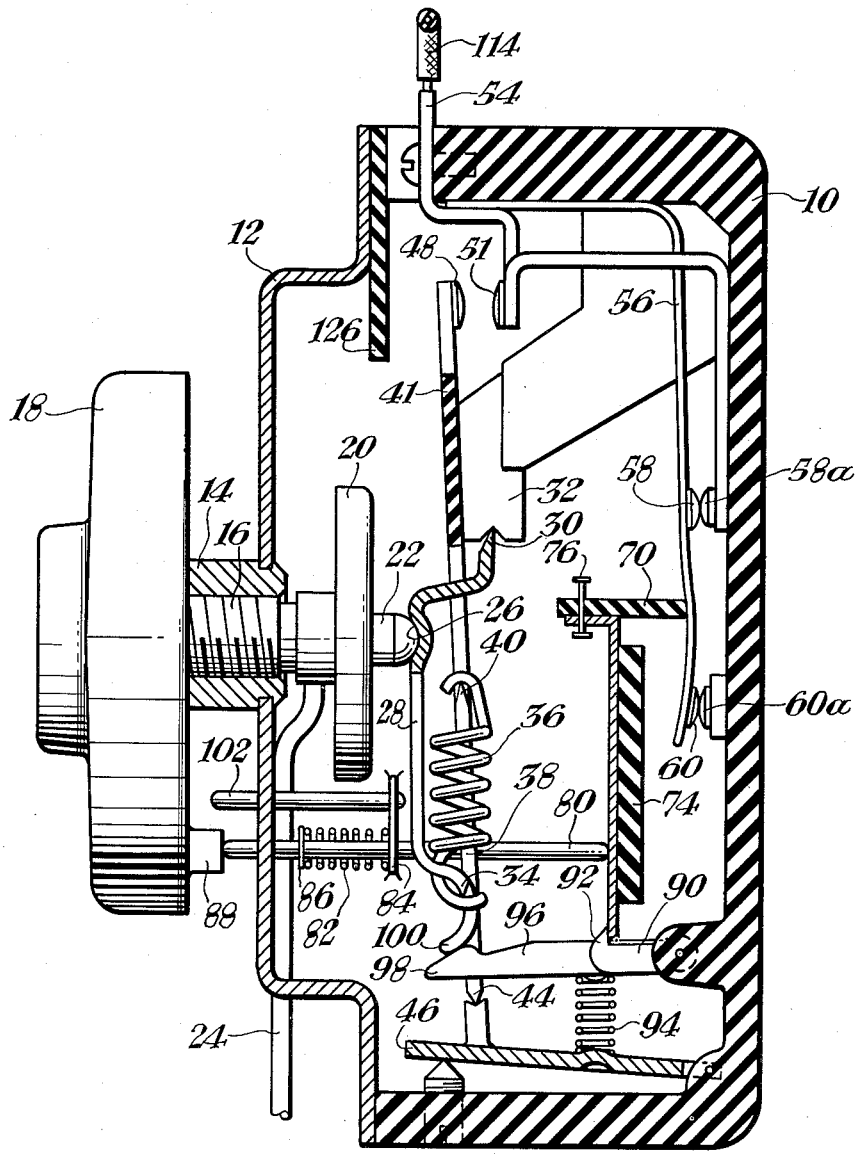
Figure 7:
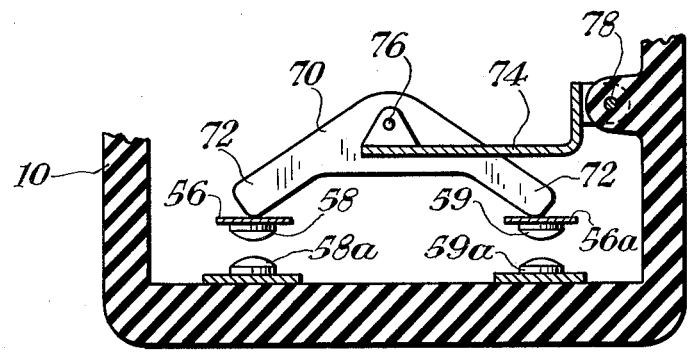
Fig. 7 is a fragmentary section taken on the line VII—VII of Fig. 1.
Figure 8:
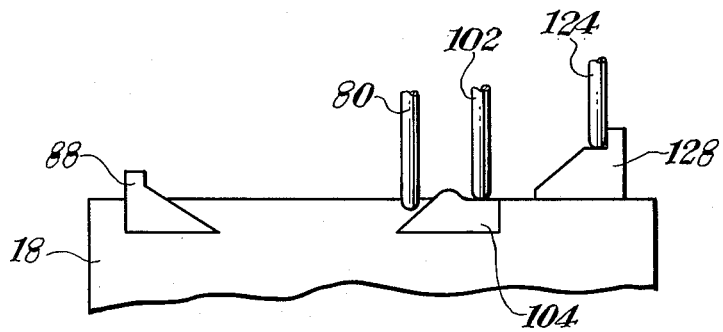
Fig. 8 is a development of a detail.

Manually operable means is provided for operating the operating lever 74 from the handle 18 and takes the form of a plunger 80 which projects through the cover 12 into engagement with the operating lever 74. A coil spring 82 is operative between an abutment 84 formed on the cover 12 and an abutment 86 carried on the plunger 80 for biasing the plunger 80 away from the operating lever 74. Convenient means for operating the plunger 80 at an appropriate angle of rotation of the handle 18 may be provided by a cam element 88 carried on the handle 18 for this purpose. In the embodiment shown and described herein and as shown in Figs. 4, 6 and 8, the cam element 88 is preferably positioned on the handle 18 so that the plunger 80 will be operated when the handle 18 is rotated to a point beyond its "high" temperature setting. Such operation will be more fully developed hereinafter.

It will be apparent that movement of the plunger 80 against the bias of the spring 82 will pivot the operating lever 74 about the pivot 78 to force the extensions 72 of the toggle plate 70 against the flexible switch arms 56, 56a causing flexing of the switch arms 56, 56a and closing of the contacts 58, 58a, 60, 60a and 59, 59a. Latching means is provided for retaining the switch arms 56, 56a in such flexed condition and is here shown as comprising a detent element 90 pivoted on the casing 10 and extending into the casing adjacent an edge of the operating lever 74.

The detent element 90 includes a pawl 92 biased toward the operating lever 74 by a spring 94 acting between the pawl 92 and the adjustable bearing support 46. As the operating lever 74 moves under the influence of the plunger 80, the lever 74 rides up over the pawl 92 until it reaches a position wherein the spring 94 can move the pawl 92 into latching engagement with the lever 74. In this position of the lever 74 as shown in Figs. 4 and 6, the toggle plate 70 is in a position to maintain the switch arms 56, 56a in their flexed position with the contacts 58, 58a, 59, 59a and 60, 60a closed.

The detent element 90 also includes a cam arm 96 which extends parallel to the pawl 92 with the end portion 98 thereof disposed adjacent the main actuating lever 28 of the snap-action means. The end portion 98 of the cam arm 96 is formed to be engaged by a depending portion 100 of the main actuating lever 28 when the main actuating lever is in a predetermined position, engagement of the depending portion 100 of the main actuating lever 28 with the end portion 98 of the cam arm 96 as the main actuating lever 28 moves towards such predetermined position being effective to move the cam arm 96 against the bias of the spring 94. The pawl 92 is secured to the cam arm 96 to move therewith so that movement of the main actuating lever 28 to said predetermined position will be effective to move the pawl 92 out of engagement with the operating lever 74 thereby releasing the toggle plate 70, permitting the switch arms 56, 56a to return to their unflexed condition and opening contacts 58, 58a, 59, 59a and 60, 60a.

Since the operating button 22 of the expansible diaphragm element 20 is engageable with the main operating lever 28, the expansible diaphragm element 20 will be effective to move the main operating lever 28 to the aforesaid predetermined position to effect release of the operating lever 74 when a predetermined temperature is sensed by the bulb 25. However, it is sometimes desirable to effect release of the operating lever 74 from the pawl 92 prior to heating of the bulb 25 to such predetermined temperature.

Accordingly, manually operable means is provided for unlatching the operating lever 74, such means preferably being effective to move the main operating lever 28 of the snap-action means to the aforesaid predetermined position wherein the depending portion 100 thereof will engage the end portion 98 of the cam arm 96 to position the pawl 92 out of engagement with the operating lever 74. This means is here shown as a plunger 102 slidably mounted in the cover 12 and in the abutment 84 formed on the cover 12. One end of the plunger 102 extends into engagement with the main actuating lever of the snap-action means and the other end of the plunger 102 extends out of the cover 12 to be engageable by a cam element 104 carried on the handle 18.

Figure 3:
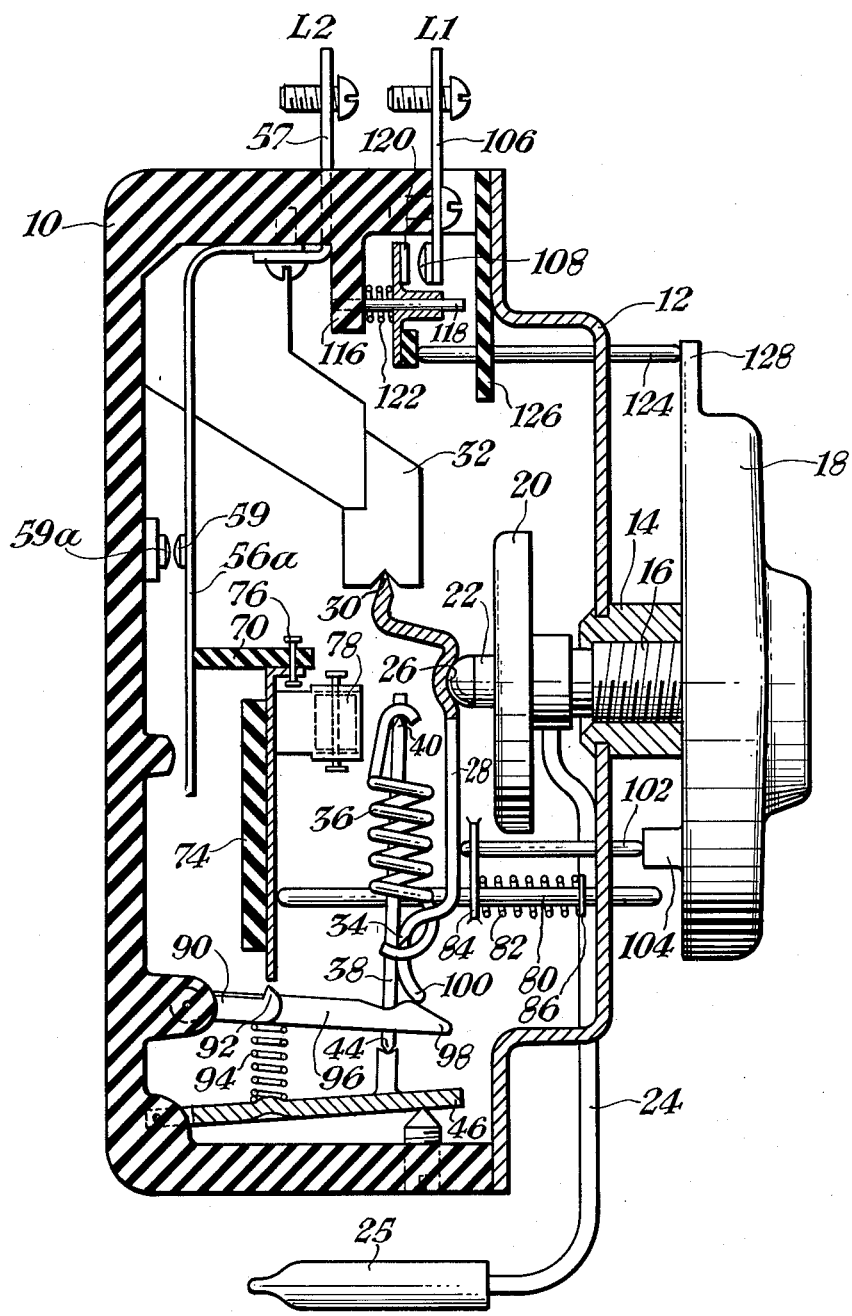
Figs. 3 and 4 are longitudinal sections taken on the line III—III of Fig. 1 and showing the operating parts in different positions.
Figure 5:
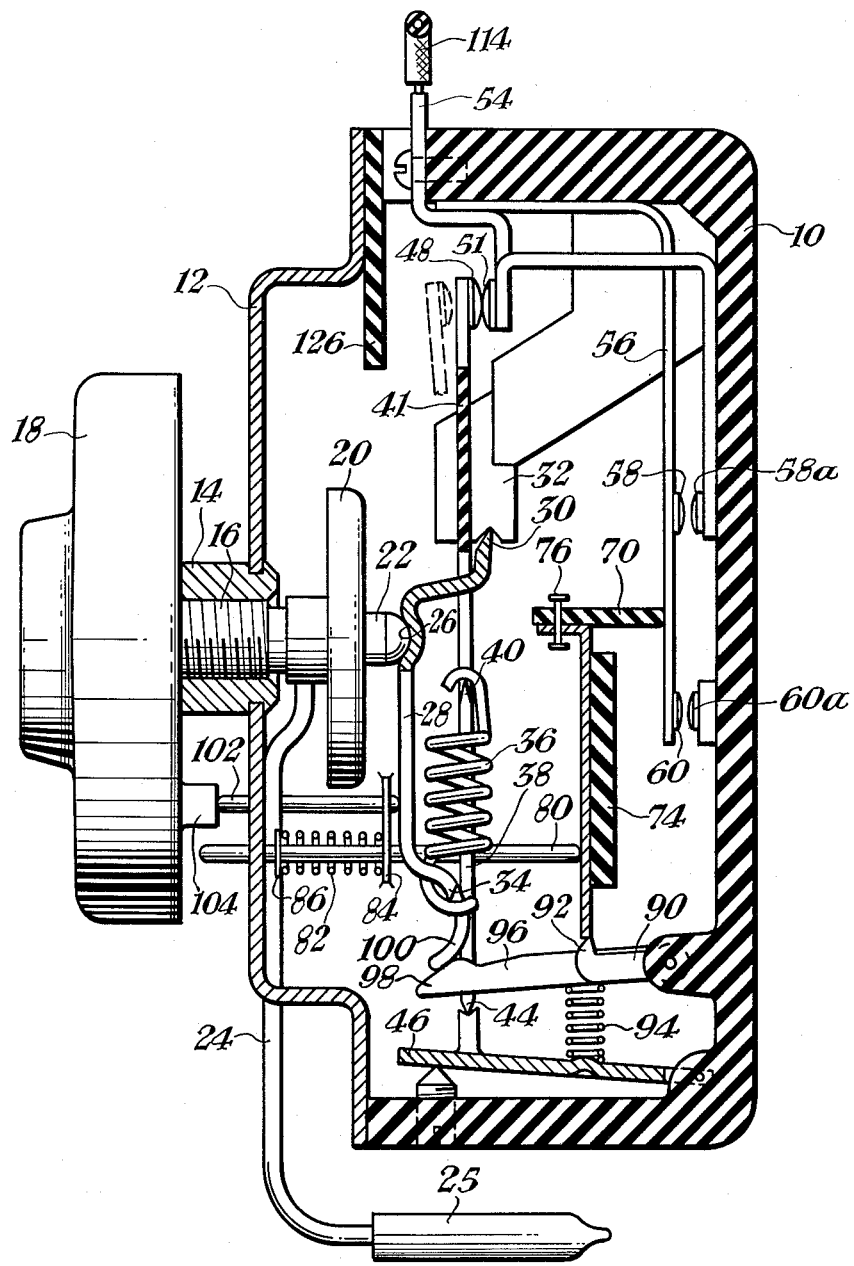
Figs. 5 and 6 are longitudinal sections taken on the line V—V of Fig. 1 and showing the operating parts in different positions.

The angular location of the cam element 104 on the handle 18, as shown in Figs. 3, 5 and 8, is preferably such that the cam element 104 will engage the plunger 102 when the handle 18 is positioned in the "off" position and the proportions of the cam element 104 are such that upon engagement of the plunger 102 thereby, the main actuating lever 28 of the snap-action means will be moved through a distance sufficient to effect unlatching of the operating lever 74 as hereinbefore described.

The connection of terminal 54 to line wire L1 is preferably controlled through auxiliary switching means interposed between the terminal 54 and a terminal connection 106 adapted for direct connection to the line wire L1. The switching means comprises a pair of contacts 108, 110 which are supported within the casing 10 and connected to the terminal connection 106 and to a terminal 112 respectively. The terminal 112 is connected to the terminal 54 by an external jumper 114. Mounted on a lug 116 formed on the casing 10 and extending into the interior thereof is a pintle 118 which slidably supports a contact bridge 120. Acting between the lug 116 and the bridge 120 is a coil spring 122 which serves to bias the latter toward the contacts 108, 110.

Manually operable means is provided for moving the contact bridge 120 against the bias of the spring 122 and out of engagement with the contacts 108, 110. This means is here shown as comprising a plunger 124 slidably mounted in the cover 112 and in a suitable bearing 126. One end of the plunger 124 extends into engagement with the bridge 120 and the other end thereof extends out of the cover 12 to be engageable by a cam element 128 formed on the handle 18. The angular location of the cam element 128 on the handle 18, as shown in Figs. 3 and 8, is such that the cam element 128 will engage the plunger 124 whenever the cam element 104 engages the plunger 102. Preferably, such engagement occurs when the handle 18 is in the "off" position.

Figure 9:
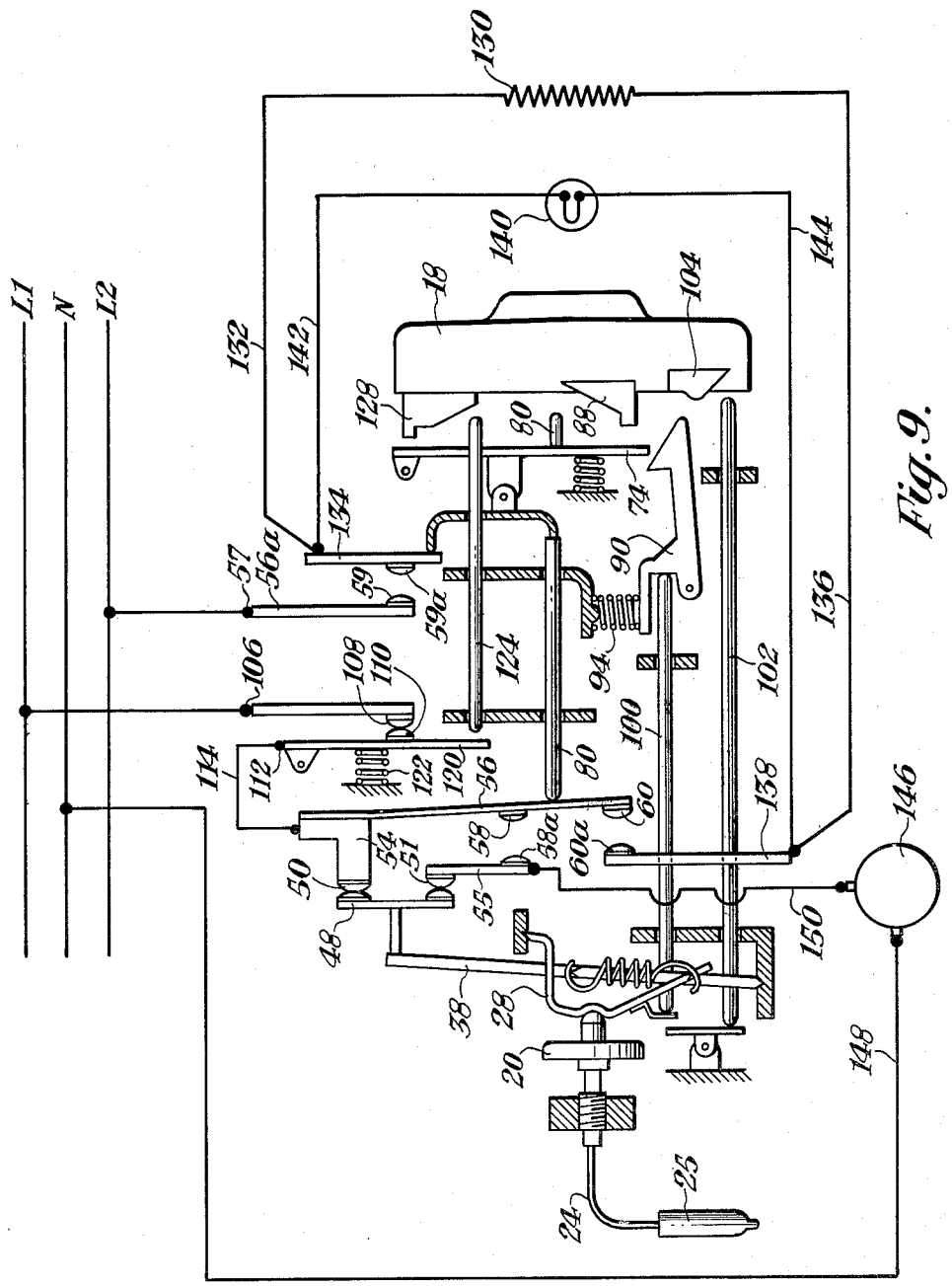
Fig. 9 is a schematic view showing the electrical connections applicable to the embodiment of the invention shown in Figs. 1 through 7 when the same is applied to a clothes drier.

Referring more particularly to the wiring diagram shown in Fig. 9, it will be apparent that the terminals 106, 57 may be connected respectively to line wires L1, L2 of a three-wire power source. A heating element 130 has one end connected by a wire 132 to a terminal 134 extending from the casing 10 and connected to contact 59a. The other end of the heater 130 is connected by a wire 136 to a terminal 138 which extends out of the casing 10 and is connected to the contact 60a. A pilot light 140 may be connected in parallel with the heater 130 by wires 142, 144 to be energized whenever the heater 130 is energized.

Heat distributing means in the form of a fan or blower (not shown) operated by an electric motor 146 is provided for circulating heated air through a load of clothing which is placed in the drying drum (not shown) to be dried. The motor 146 may also operate the drum which revolves during the drying operation. The motor 146 is shown in Fig. 9 as having one terminal connected to neutral wire N of the three-wire power source by a wire 148 and having the opposite terminal connected by a wire 150 to the terminal 55 which extends from the casing 10 and is connected to the contact 58a. Further description of circuits for the heating element 130 and the motor 146 will be given in connection with the description of the operation of the device which follows.

In the operation of the device, it may be assumed that the handle 18 is in the "off" position so that the cam element 104 has forced the plunger 102 inwardly to engage the main actuating lever 28 of the snap-action means to position the depending portion 100 of the main actuating lever 28 in engagement with the end portion 98 of the cam arm 96. The flexible switch arms 56, 56a are thus free to assume their unflexed position to maintain the contacts 58, 58a, 60, 60a and 59, 59a in their open positions. In the "off" position of the handle 18, the cam element 128 has forced the plunger 124 inwardly to hold the contact bridge 120 out of engagement with the contacts 108, 110. Thus, the circuits are broken on both sides of the line and movement of the handle 18 in a counterclockwise direction is required to disengage the plungers 102, 124 from the cam elements 104, 128 respectively.

Rotation of the handle 18 in a counterclockwise direction from "off" to a preselected "start" setting, preferably beyond the highest temperature setting, will cause inward longitudinal movement of the stud 16 and similar movement of the diaphragm 20 and button 22 but this movement is insufficient to operate the main actuating lever 28 through a distance effective to cause snap action of the main control lever 38. Thus, the auxiliary switching means for the motor 146 comprising the main control lever 38 remains in a position where the contact bridge 48 is disengaged from the contacts 50, 51.

In the "start" position of the handle 18, as best shown in Figs. 4 and 6, the cam element 88 is in engagement with the plunger 80 to force the same inwardly causing rotation of the operating lever 74 into latching engagement with the pawl 92 and moving the toggle plate 70 to a position which will flex the switch arms 56, 56a and close contacts 58, 58a, 60, 60a and 59, 59a. The handle 18 may then be rotated in a clockwise direction to a desired temperature setting intermediate the "off" and "start" positions. Such return movement of the handle 18 will move the cam element 88 out of engagement with the plunger 80 to permit the same to return to its outermost position out of engagement with the operaing lever 74 under the bias of the spring 82.

As the handle 18 moves in a counterclockwise direction from the "off" position, the cam element 128 is moved out of engagement with the plunger 124 to permit the contact bridge 120 to move along the pintle 118 under the bias of the spring 122 to engage contacts 108, 110 thereby completing the circuit between the terminal 106 and the terminal 54 through the jumper 114.

A circuit may now be traced on Fig. 9 from line wire L1 to terminal 106, contacts 108, 110, contact bridge 120, jumper 114, terminal 54, switch arm 56, contacts 60, 60a, terminal 138, wire 136, heater 130, wire 132, terminal 134, contacts 59, 59a, switch arm 56a, and terminal 57 to line wire L2. The energizing circuit for the heater 130 is thus complete.

At the same time, a circuit for the motor 146 may also be traced from line wire L1 to terminal 106, contacts 108, 110, contact bridge 120, terminal 112, jumper 114, terminal 54, switch arm 56, contacts 58, 58a, terminal 55, wire 150, motor 146, and wire 148 to line wire N. Thus, the circuit for the motor 146 is completed and operation of both the heating element 130 and motor 146 can occur.

When the temperature in the drying apparatus reaches that which has been preselected on the dial 18, the diaphragm 20 will be expanded sufficiently to cause over center snap action of the main control lever 38 to close contacts 50, 51. When the main control lever 38 snaps over center to close the contacts 50, 51, a second energizing or holding circuit for the motor 146 is completed and may be traced as follows: from line wire L1 to terminal 106, contacts 108, 110, contact bridge 120, terminal 112, jumper 114, terminal 54, contact 50, contact bridge 48, contact 51, terminal 55, wire 150, motor 146, and wire 148 to line wire N.

Further temperature rise in the drying appliance will cause additional expansion of the bellows 20 and further movement of the main actuating element 28 to move the depending portion 100 thereof into engagement with the end portion 98 of the cam arm 96 for disengaging the pawl 92 from the operating lever 74. Release of the operating lever 74 will permit movement of the switch arms 56, 56a, under their inherent bias, to their unflexed positions and opening of the contacts 58, 58a, 60, 60a, and 59, 59a. Accordingly, the first traced circuit for the motor 146 and the heater circuit are broken, the heater 130 being de-energized but the motor 146 remaining energized through the holding circuit therefor.

When the temperature at the bulb 25 drops an amount corresponding to the differential of the thermostat, the diaphragm 20 contracts sufficiently to cause over-center snap action of the main control lever 38 in the opposite direction. The auxiliary switching means comprising the contacts 50, 51 and control bridge 48 is therefore opened to break the holding circuit and the motor ceases to run.

In the event that it is desired to terminate the drying operation after the appliance has been placed in operation as described above, the handle 18 is merely returned to the "off" position wherein the cam elements 104, 128 move into engagement with the plungers 102, 124, respectively, to move the same to their innermost positions. Inward movement of the plunger 102 will impart movement to the main actuating lever 28 similar to movement imparted thereto by thermostatic action of the diaphragm 20.

However, such movement of the main actuating lever 28 will be independent of the diaphragm 20 and will move the depending portion 100 into engagement with the end portion 98 of the cam arm 96 to disengage the pawl 92 from the operating lever 74 thereby permitting the switch arms 56, 56a to move under their inherent bias and break contacts 58, 58a, 60, 60a, and 59, 59a to cause deenergization of the heater 130. Movement of the main actuating lever 28 by the plunger 102 will also cause over-center snap movement of the main control lever 38 and closing of the contacts 50, 51 by the contact bridge 48. However, such movement of the main control lever 38 is ineffective to energize the motor 146 since the energizing circuit therefor is broken by inward movement of the plunger 124 to move the contact bridge 120 out of engagement with the contacts 108, 110.

It is thus apparent that the auxiliary switching means comprising the contacts 50, 51 and contact bridge 48 is operated thermostatically and will be opened and closed according to the temperature at the bulb 60. The switches controlled by the main actuating lever 28 of the snap-action means, that is the contacts 58, 58a, 60, 60a and 59, 59a, are operated thermostatically to open position but require manual resetting to closed position. However, the switches controlled by the main actuating lever 28 may be manually opened independently of the thermally responsive device.

It will be understood that various changes may be made in the details of construction and arrangement of parts and that the control device may be utilized for useful purposes other than clothes drying controls, for example, in electric ranges. The cam arrangement for actuating the various plungers could be eliminated and a sliding dial utilized in place thereof. Rather than utilizing rotational movement of the handle to actuate the various plungers, separate push buttons could be used. These and other modifications may be made within the scope of the appended claims without departing from the scope of the invention.

It is claimed and desired to secure by Letters Patent:

1. A control device comprising switching means having open and closed positions for controlling an energizing circuit, switching means having open and closed positions for controlling a second energizing circuit, means including a manually operable element movable between a plurality of controlling positions for closing both said switching means to establish said circuits when said element is moved to one of said positions, auxiliary switching means having open and closed positions for controlling one of said circuits independently of said switching means therefor, means responsive to changes in a condition to be controlled, means for opening both said switching means upon a change in said condition affecting said condition responsive means and for substantially simultaneously closing said auxiliary switching means to maintain said one of said circuits, means for opening said auxiliary switching means to discontinue said one of said circuits upon a further change in said condition affecting said condition responsive means, means for controlling said energizing circuits independently of said condition responsive means, and means operatively associated with said last named means for discontinuing both said energizing circuits upon movement of said element to another of said positions.

2. A control device comprising switching means having open and closed positions for controlling an energizing circuit, switching means having open and closed positions for controlling a second energizing circuit, means including a manually operable element movable between a plurality of controlling positions for closing both said switching means to establish said circuits when said element is moved to one of said positions, auxiliary switching means having open and closed positions for controlling one of said circuits independently of said switching means therefor, means responsive to changes in a condition to be controlled, means for opening both said switching means upon a change in said condition affecting said condition responsive means and for substantially simultaneously closing said auxiliary switching means to maintain said one of said circuits, means for opening said auxiliary switching means to discontinue said one of said circuits upon a further change in said condition affecting said condition responsive means, actuating means operable for opening both said switching means independently of said condition responsive means, and means operatively associated with said manually operable element for operating said actuating means in response to movement of said element to another of said positions.

3. A control device as claimed in claim 2 and including second auxiliary switching means having open and closed positions for controlling said one circuit independently of said first auxiliary switching means and said switching means therefor, auxiliary actuating means for opening said second auxiliary switching means independently of said condition responsive means, and means operatively associated with said manually operable element for operating said auxiliary actuating means in response to movement of said element to said other position.

4. A control device for electrical heating apparatus comprising switching means having open and closed positions for controlling an energizing circuit, switching means having open and closed positions for controlling a second energizing circuit, means for biasing both said switching means to open position, means including a manually operable element movable between a plurality of controlling positions and operative in one of said positions for overcoming said biasing means and closing both said switching means to establish said circuits, means for latching both said switching means in closed position, auxiliary switching means having open and closed positions for controlling said second energizing circuit independently of said switching means therefor, means for biasing said auxiliary switching means to open position, temperature responsive means, means for releasing said latching means to open both said switching means upon a change in temperature affecting said temperature responsive means and for substantailly simultaneously overcoming the biasing means for said auxiliary switching means for closing the same to maintain said second energizing circuit, said auxiliary switching means being opened by the biasing means therefor upon a further change in temperature affecting said temperature responsive means, actuating means operable for releasing said latching means to open both said switching means independently of said temperature responsive means, and manually operable means for operating said actuating means.

5. A control device as claimed in claim 4 wherein said manually operable means is operatively associated with said manually operable element for operating said actuating means in response to movement of said element to another of said positions.

6. A control device as claimed in claim 5 and including second auxiliary switching means having open and closed positions for controlling said second energizing circuit, auxiliary actuating means for opening said second auxiliary switching means independently of said condition responsive means, and means operatively associated with said manually operable element for operating said auxiliary actuating means in response to movement of said element to said other position.

7. A control device for electrical heating apparatus comprising switching means having open and closed positions for controlling an energizing circuit, switching means having open and closed positions for controlling a second energizing circuit, temperature responsive means adjustable to different temperature settings, adjusting means for said temperature responsive means including a rotatable element movable between a plurality of positions, a reciprocable element for closing both said switching means to establish said circuits, means for actuating said reciprocable element for closing both said switching means upon movement of said rotatable element to one of said positions, auxiliary switching means having open and closed positions for controlling said second energizing circuit independently of said switching means therefor, means for opening both said switching means upon a change in temperature affecting said temperature responsive means and for substantially simultaneously closing said auxiliary switching means to maintain said second energizing circuit, means for opening said auxiliary switching means to discontinue said second energizing circuit upon a further change in temperature affecting said temperature responsive means, a reciprocable element for opening both said switching means independently of said temperature responsive means, and means for actuating said last named reciprocable element for opening both said switching means upon movement of said rotatable element to another of said positions.

8. A control device as claimed in claim 7 and including second auxiliary switching means having open and closed positions for controlling said second energizing circuit, auxiliary actuating means for opening said second auxiliary switch means independently of said condition responsive means, and means operatively associated with said rotatable element for operating said auxiliary actuating means in response to movement of said element to said other position.

9. A control device for electrical heat distributing apparatus comprising switching means having open and closed positions for controlling a heating circuit, switching means having open and closed positions for controlling a heat distributing circuit, means for biasing both said switching means to open position, temperature responsive means adjustable to different temperature settings, adjusting means for said temperature responsive means including reciprocable and rotatable means, said reciprocable means being operative for overcoming said biasing means and closing both said switching means to establish said circuits, means for latching both said switching means in closed position, auxiliary switching means having open and closed positions for controlling said heat distributing circuit, means for biasing said auxiliary switching means to open position, said closed position being established when said rotatable means is adjusted to a selected setting, means for releasing said latching means to open both said switching means upon a change in temperature affecting said temperature responsive means and for substantially simultaneously overcoming the biasing means for said auxiliary switching means for closing the same to maintain said heat distributing circuit, said auxiliary switching means being opened by the biasing means therefor upon a further change in temperature affecting said temperature responsive means, second reciprocable means for releasing said latching means to open both said switching means independently of said temperature responsive means, and means for actuating said second reciprocable means to open both said switching means upon adjustment of said rotatable means to a second selected setting.

10. A control device as claimed in claim 9 and including secondary auxiliary switching means having open and closed positions for controlling said heat distributing circuit, auxiliary actuating means for opening said second auxiliary switching means independently of said condition responsive means, and means operatively associated with said rotatable means for operating said auxiliary actuating means in response to movement of said rotatable means to said second selected setting.

11. A thermostatic control device comprising a main switch including a movable switch arm biased to one controlling position, manually operable means for moving said main switch arm to another controlling position, latching means for holding said main switch arm in said other position, an auxiliary switch including a movable switch arm biased to one controlling position, a third switch including a movable switch arm biased to one controlling position and connected to said auxiliary switch, means including a movable element operatively associated with said latching means and said auxiliary switch and movable to a predetermined position for releasing said main switch arm and moving said auxiliary switch arm to another controlling position, temperature responsive means for moving said element to said predetermined position, and manually operable means for moving said element to said predetermined position and said third switch arm to another controlling position independently of said temperature responsive means.

12. A control device as claimed in claim 11 wherein said last named manually operable means includes a rotatable member operatively engageable with said element and said third switch arm in one position thereof, said rotatable member being operatively associated with said temperature responsive means for setting the temperature to which said temperature responsive means will respond.

13. A thermostatic control device comprising a main switch including a movable switch arm biased to one controlling position, temperature responsive means, temperature adjusting means for said temperature responsive means and including a rotatable member, manually operable means including said rotatable member for moving said main switch arm to another controlling position, latching means for holding said main switch arm in said other position, an auxiliary switch including a movable switch arm biased to one controlling position, a third switch including a movable switch arm biased to one controlling position and connected to said auxiliary switch, means including a movable element operatively associated with said latching means and said auxiliary switch and movable to a predetermined position for releasing said main switch arm and moving said auxiliary switch arm to another controlling position, connection means between said temperature responsive means and said element for moving said element to said predetermined position, and manually operable means including said rotatable member for moving said element to said predetermined position and said third switch arm to another controlling position independently of said temperature responsive means.

References Cited in the file of this patent

UNITED STATES PATENTS

| | | |
|---|---|---|
| 2,385,434 | Weber | Sept. 25, 1945 |
| 2,403,824 | Newell | July 9, 1946 |
| 2,591,802 | Garner | Apr. 8, 1952 |
| 2,671,136 | Greenawalt | Mar. 2, 1954 |